Figure 3:
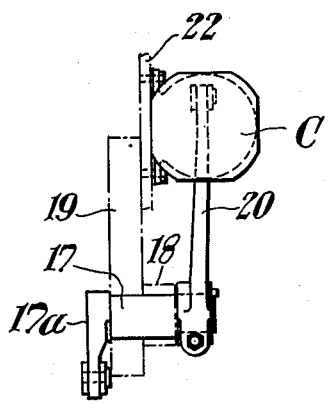

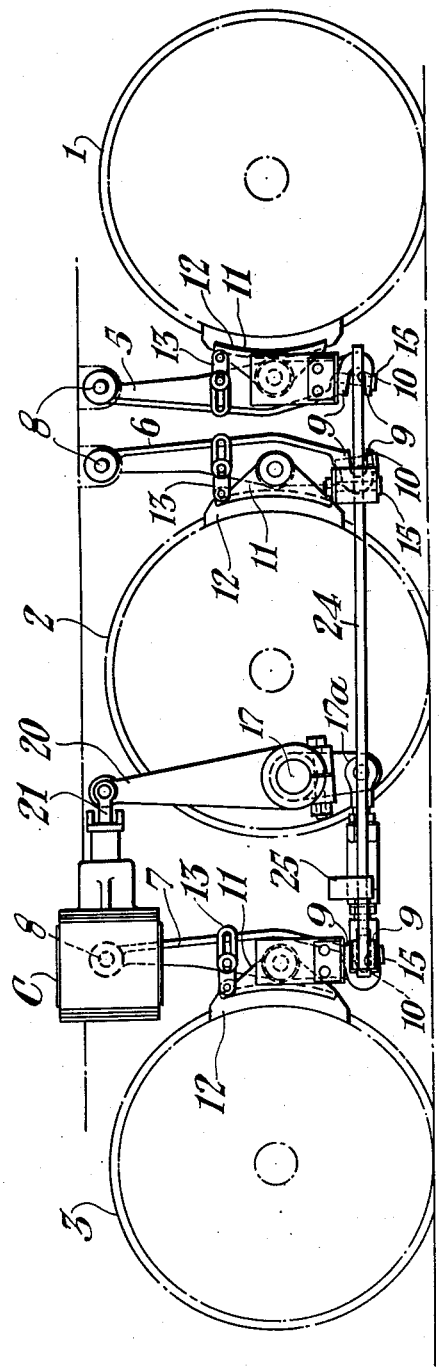

Oct. 17, 1950  T. C. CROSSMAN ET AL  2,526,333
BRAKE RIGGING

Filed June 5, 1947  2 Sheets—Sheet 2

INVENTORS
Theodore C. Crossman and
Emil G. Mueller.
BY
THEIR ATTORNEY

Patented Oct. 17, 1950

2,526,333

UNITED STATES PATENT OFFICE 2,526,333

BRAKE RIGGING

Theodore C. Crossman, Wilkinsburg, and Emil G. Mueller, Churchill, Pa., assignors to The American Brake Company, Swissvale, Pa., a corporation of Missouri Application June 5, 1947, Serial No. 752,592

1 Claim. (Cl. 188—46)

Our invention relates to brake rigging for railway rolling stock, and particularly to brake rigging suitable for use on a six-wheel motor truck for a Diesel electric locomotive.

One object of our invention is to provide a brake rigging of the type described which can be conveniently mounted on the motor truck within the limited space available.

According to our invention, we provide each wheel with a single brake shoe, and we employ two brake cylinders, one for actuating the brake shoes associated with the three wheels on one side of the truck, and the other for actuating the brake shoes associated with the three wheels on the other side of the truck. The piston rod of each brake cylinder is pivotally connected at one end to the upper end of a brake cylinder lever which is secured at its lower end to a crank pivotally mounted in the side frame of the truck, and each crank is connected through a push connector including a turnbuckle for taking up slack with a first floating equalizer lever intermediate its ends. The said first floating equalizer lever is operatively connected at its inner end with a brake shoe for one rear wheel of the truck through the medium of a hanger lever, and is operatively connected at its outer end with one end of a pull rod. The pull rod is slidably supported adjacent its point of connection with said first floating equalizer lever by means of a rod support secured to the side frame of the truck, whereby said pull rod serves to support the outer end of said first equalizer lever, and is operatively connected at its opposite end with the outer end of a second similar floating equalizer lever. Said second floating equalizer lever is operatively connected at its inner end with a brake shoe for the one front wheel of the truck through the medium of a hanger lever, and is operatively connected intermediate its ends by means of a push connector with a third lever associated with the one middle wheel of the truck. Said third lever is pivotally attached at its outer end to the truck frame by means of a pivot pin which is mounted in a fulcrum bracket secured to the side frame of the truck and is operatively connected at its inner end with a brake shoe for the one middle wheel of the truck through the medium of a third hanger lever. The pivot pin which serves to pivotally attach said third lever to the fulcrum bracket extends through a slot provided in said pull rod and through jaws which straddle said pull rod, whereby said fulcrum bracket serves as a support for the associated end of the pull rod, and the pull rod, in turn, serves as a support for the outer end of said second floating equalizer lever.

Other objects and characteristic features of our invention will become apparent as the description proceeds.

We shall describe one form of brake rigging embodying our invention, and shall then point out the novel features thereof in the claim.

Figure 6:
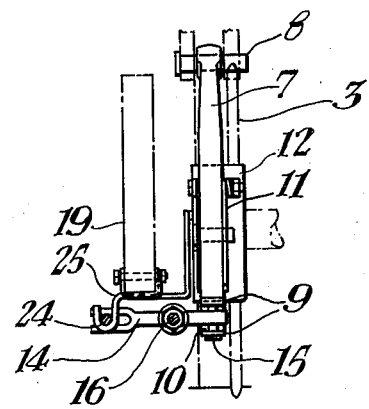
Figure 4:
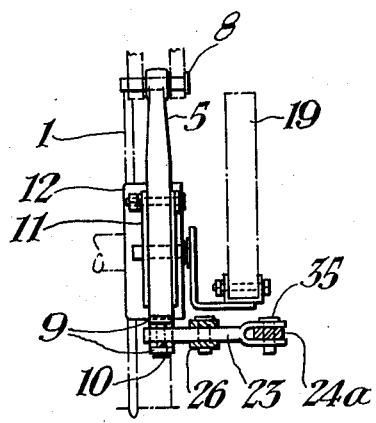
Figure 5:
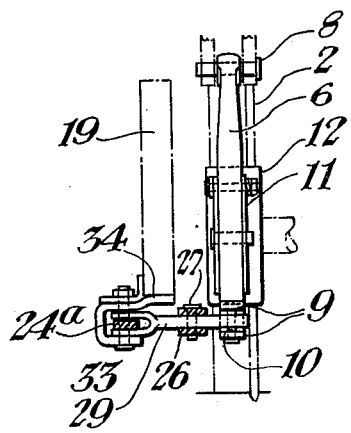

In the accompanying drawing, Fig. 1 is a side elevational view of a Diesel electric locomotive truck provided with one form of brake rigging embodying our invention. Fig. 2 is a top plan view of that portion of the brake rigging embodying our invention which is applied to one-half of the truck, it being understood that the portion which is applied to the other half of the truck is identical with the portion shown. Fig. 3 is a left-hand end view of the portion of the brake rigging shown in Fig. 2. Fig. 4 is a view of a portion of the brake rigging associated with the first wheel of the truck as it appears when viewed from the left in Fig. 1. Figs. 5 and 6 are portions of the brake rigging associated with the second and third wheels of the truck as they appear when viewed from the right in Fig. 1.

Similar reference characters refer to similar parts in each of the several views.

Referring to the drawings, the reference characters 1, 2 and 3 designate respectively the front, middle and rear wheels at one side of a six-wheel motor truck for a Diesel electric locomotive. Only one-half of the truck is shown because the other half is identical to the half which is shown, and it should be pointed out at the outset that in the description which follows the half of the truck which is not shown is provided with symmetrical brake rigging which is a duplicate of that which I shall now describe.

The brake rigging as shown comprises a hanger lever 5 disposed at the rear side of the front wheel 1, a hanger lever 6 disposed at the forward side of the middle wheel 2, and a hanger lever 7 disposed at the forward side of the rear wheel 3. The hanger levers are pivotally attached at their upper ends to the truck frame by means of pivot pins 8, and each hanger lever is provided at its lower end with spaced jaws 9 which form a recess 10. A brake head 11 is pivotally attached to each hanger lever intermediate its ends, and each brake head carries a brake shoe 12 for engagement with the tread of the associated wheel.

Associated with each brake head 11 is a brake head balancing device 13 which in itself forms no part of our present invention, and which may, for example, be similar to that disclosed and claimed in Letters Patent of the United States No. 2,130,595, granted to Emil G. Mueller on September 20, 1938, for Brake Head Balancing Device.

A transversely extending horizontally disposed floating equalizer lever 14 is secured at its inner end within the recess 10 in the hanger lever 7 by means of a pivot pin 15 which extends through registered openings formed in the equalizer lever and in the jaws 9 of the hanger lever, and is operatively connected intermediate its ends by means of a push rod 16 with the depending arm 17a of a crank 17 which, as best seen in Fig. 3, is pivotally supported in a bearing 18 provided on the side frame 19 of the truck. A vertically disposed brake cylinder lever 20 is secured to the crank 17 on the opposite side of the bearing 18 from the depending arm 17a and is operatively connected at its upper end with the push rod 21 of a brake cylinder C. The brake cylinder C is conveniently mounted on a vertical supporting member 22 provided on the side of the truck frame in front of the rear wheel 3. The brake cylinder is of the usual type and includes the usual cylinder portion (not shown), return spring (not shown), and push rod 21 operated by the piston.

The push rod 16 includes a turnbuckle 16a of well-known construction for taking up slack in the brake rigging.

The outer end of the floating equalizer lever 14 is operatively connected with the outer end of a second floating equalizer lever 23 by means of a pull rod 24. The pull rod 24 is slidably supported adjacent its point of connection with the floating equalizer lever 14 by means of a rod support 25 secured to the side frame 19 of the truck and it will be obvious, therefore, that the pull rod serves as a means for supporting the outer end of the equalizer lever 14.

The floating equalizer lever 23 is operatively connected at its inner end with the lower end of the hanger lever 5 in the same manner that the inner end of the floating equalizer lever 14 is operatively connected with the lower end of the hanger lever 7. Intermediate its ends the floating equalizer lever 23 is operatively connected by means of a push connector 26 and two pins 27 and 28 with a third dead transversely extending lever 29 which is associated with the middle wheel 2, and which is similar in all respects to the floating equalizer levers 14 and 23. The push connector 26 is provided at one end with spaced holes 30 through either one of which the pivot pin 27 may be passed, and at the other end with spaced holes 31 through either one of which the pivot pin 28 may be passed, to permit the effective length of the push connector to be varied to compensate for different degrees of brake shoe and tire wear as will be obvious. The pull rod 24 is likewise provided at the end to which the floating equalizer 23 is pivotally attached with a plurality of holes 32 through any one of which the pivot pin 35 which serves to pivotally attach the lever 23 to the pull rod, may be attached also for the purpose of providing some adjustment for taking up slack.

The inner end of the lever 29 is operatively connected with the lower end of the hanger lever 6 in the same manner that the inner ends of the floating equalizer levers 14 and 23 are operatively connected with the lower ends of the hanger levers 7 and 5, respectively.

The lever 29 is pivotally supported at its outer end by means of a pivot pin 33 mounted in a fulcrum bracket 34 secured to the side frame 19 of the truck. The end of the lever 29 through which the pivot pin 33 extends is bifurcated and these bifurcations straddle a flattened portion 24a of the pull rod 24 between the upper and lower sides of the fulcrum bracket. The pivot pin 33 extends through the bifurcations and through an elongated slot 24b in the flattened portion 24a of the pull rod, whereby the pull rod is free to move longitudinally with respect to the pivot pin but is slidably supported by the fulcrum bracket in such manner that the pull rod serves to support the outer end of the floating equalizer lever 23.

In operation when fluid pressure is supplied to the brake cylinder C, the push rod 21 is forced outwardly in the cylinder, and this outward movement of the push rod acts through the brake cylinder lever 20, crank 17, and push connector 16 to move the floating equalizer lever 14 toward the left as viewed in Fig. 2. This movement of the floating equalizer lever 14 will first cause this lever to pivot about its point of connection with the pull rod 24 and move the hanger lever 7 toward the wheel 3 until the associated brake shoe 12 moves into frictional contact with the wheel, whereupon the continued movement of the equalizer lever by the push connector will then cause this lever to fulcrum about its inner end and thus move the pull rod 24 toward the left. This latter movement, in turn, will first cause the floating equalizer lever 23 to pivot about its point of connection with the push connector 26 and move the hanger lever 5 toward the wheel 1 until the brake shoe 12 associated with the wheel 1 moves into frictional contact with this wheel, and will then cause the equalizer lever 23 to fulcrum about its point of connection with the hanger lever 5 and move the push connector 26 to the left. The movement of the push connector 26 to the left will cause the lever 29 to swing in a counterclockwise direction about the pivot pin 33 to the position in which the brake shoe 12 secured to the hanger lever 6 moves into frictional engagement with the wheel 2. The parts are preferably so proportioned that when all of the brake shoes have moved into frictional engagement with the associated wheel, the braking force exerted by the shoes on the associated wheels will be substantially equal. However, if unequal braking forces on the wheels are desired, this result can readily be attained by a different proportioning of the parts, as will be obvious.

To release the brakes, the fluid which was supplied to the brake cylinder C to apply the brakes is vented from the brake cylinder in the usual manner, whereupon the force due to the release spring disposed within the brake cylinder together with the force of gravity acting on the hanger levers will act to move the hanger levers and hence the brake shoes to their released positions.

It should be particularly noted that with the brake rigging constructed in the manner described all parts of the brake rigging with the exception of the hanger levers 5, 6 and 7 are disposed outboard the wheels where they will not interfere with any part of the driving mechanism for the wheels. This driving mechanism is not shown but it will be understood that this driving mechanism comprises an integral part of the motor truck.

One advantage of the brake rigging embodying our invention is that the supports which are provided for the pull rod 24 also serves through the medium of the pull rod as supports for the outer ends of the levers 14, 29 and 23.

Another advantage of the brake rigging embodying our invention is that the hanger levers associated with each of the wheels can all be made alike and the two floating equalizer levers and the lever 29 can likewise be made alike so that a minimum number of different kinds of parts is required.

Although we have herein shown and described only one form of brake rigging embodying our invention, it is understood that various changes and modifications may be made therein within the scope of the appended claim without departing from the spirit and scope of our invention.

Having thus described our invention, what we claim is:

A brake rigging for a six wheel truck comprising at one side of the truck a first floating transversely extending equalizer lever operatively connected at its inner end with means for applying a brake to the forward side of the one rear wheel of the truck, a second floating transversely extending equalizer lever operatively connected at its inner end with means for applying a brake to the rear side of the one front wheel of the truck, a third transversely extending lever operatively connected at its inner end with means for applying a brake to the forward side of the one middle wheel of the truck, the outer end of said third lever being bifurcated and being pivoted on a pivot pin extending through said bifurcations and through a fulcrum bracket secured to the truck frame, a pull rod slidably supported adjacent one end in a rod support secured to the truck frame and adjacent the other end between the bifurcations of said third lever, said rod being secured at its ends to the outer ends of said first and second levers and being provided at the portion which is slidably supported between the bifurcations of said third lever with an elongated slot through which said pivot pin passes with clearance, a push connector connecting said second and third levers intermediate their ends, and means connected with said first lever intermediate its ends to actuate it.

THEODORE C. CROSSMAN.
EMIL G. MUELLER.

REFERENCES CITED

The following references are of record in the file of this patent:

UNITED STATES PATENTS

| Number | Name | Date |
| --- | --- | --- |
| 2,427,956 | Gantner | Sept. 23, 1947 |